(12) United States Patent
Okuda et al.

(10) Patent No.: US 11,345,134 B2
(45) Date of Patent: May 31, 2022

(54) DECORATIVE SHEET HAVING THREE-DIMENSIONAL METALLIC DESIGN AND METHOD FOR PRODUCING DECORATIVE SHEET

(71) Applicant: NISSHA CO., LTD., Kyoto (JP)

(72) Inventors: Michiyasu Okuda, Kyoto (JP);
Yasuhide Fukada, Kyoto (JP);
Hiroyasu Shigeta, Kyoto (JP); Shinichi Kitamura, Kyoto (JP); Tetsuya Ito, Tokyo (JP)

(73) Assignee: NISSHA CO., LTD., Kyoto (JP)

( * ) Notice: Subject to any disclaimer, the term of this patent is extended or adjusted under 35 U.S.C. 154(b) by 887 days.

(21) Appl. No.: 16/076,287

(22) PCT Filed: Jan. 20, 2017

(86) PCT No.: PCT/JP2017/001925
§ 371 (c)(1),
(2) Date: Aug. 7, 2018

(87) PCT Pub. No.: WO2017/138328
PCT Pub. Date: Aug. 17, 2017

(65) Prior Publication Data
US 2021/0187926 A1    Jun. 24, 2021

(30) Foreign Application Priority Data
Feb. 9, 2016  (JP) .............................. JP2016-022979

(51) Int. Cl.
*B32B 37/00*  (2006.01)
*B32B 37/06*  (2006.01)
(Continued)

(52) U.S. Cl.
CPC ........ *B32B 37/025* (2013.01); *B32B 37/0053* (2013.01); *B32B 37/06* (2013.01);
(Continued)

(58) Field of Classification Search
None
See application file for complete search history.

(56) References Cited

U.S. PATENT DOCUMENTS 4,605,461 A * 8/1986 Ogi ..................... B44C 1/165
156/233
6,165,611 A   12/2000 Hirano et al.
(Continued)

FOREIGN PATENT DOCUMENTS

JP    H05-124395 A    5/1993
JP    H06-75517 A     3/1994
(Continued)

OTHER PUBLICATIONS

International Search Report in PCT/JP2017/001925 dated Mar. 21, 2017.

*Primary Examiner* — Linda L Gray
(74) *Attorney, Agent, or Firm* — Global IP Counselors, LLP

(57) ABSTRACT

An inexpensive decorative sheet has a fine three-dimensional metallic design. A base vapor deposition film and a transfer sheet are provided. The base vapor deposition film includes a transparent film base of primarily a thermoplastic resin and is light-transmissive, and an underlying metal layer. The transfer sheet includes a transfer base film and a reflection pattern formation layer including a pattern metal layer. The transfer sheet is placed onto the base vapor deposition film, and a transfer roller is pressed against the transfer base film to embed a portion of the reflection pattern formation layer onto the base vapor deposition film and bond the portion to the base vapor deposition film. The transfer roller includes a transfer surface, which corresponds to a predetermined design. The transfer sheet is peeled away (Continued)

from the base vapor deposition film to transfer a reflection pattern to the base vapor deposition film.

15 Claims, 11 Drawing Sheets

(51) Int. Cl.
  *B32B 37/10* (2006.01)
  *B44C 1/17* (2006.01)
  *B44F 1/02* (2006.01)
  *H04M 1/02* (2006.01)

(52) U.S. Cl.
  CPC ............ *B32B 37/10* (2013.01); *B44C 1/1716* (2013.01); *B44F 1/02* (2013.01); *H04M 1/0283* (2013.01); *B32B 2457/00* (2013.01)

(56) References Cited

U.S. PATENT DOCUMENTS

| | | | |
|---|---|---|---|
| 9,640,304 B2* | 5/2017 | Yoo | ........................ B32B 27/365 |
| 9,827,804 B2 | 11/2017 | Ide | |
| 2008/0191386 A1 | 8/2008 | Fukuda et al. | |
| 2009/0304993 A1 | 12/2009 | Yoshikawa et al. | |
| 2015/0185375 A1* | 7/2015 | Hannington | .......... B29C 64/112 |
| | | | 359/540 |

FOREIGN PATENT DOCUMENTS

| | | |
|---|---|---|
| JP | H10-16415 A | 1/1998 |
| JP | 2005259499 A | 9/2005 |
| JP | 4192842 B2 | 12/2008 |
| JP | 4690794 B2 | 6/2011 |
| JP | 5617258 B2 | 11/2014 |
| WO | 2006057198 A1 | 6/2006 |
| WO | 2015174089 A1 | 11/2015 |

* cited by examiner

DECORATIVE SHEET HAVING THREE-DIMENSIONAL METALLIC DESIGN AND METHOD FOR PRODUCING DECORATIVE SHEET

CROSS-REFERENCE TO RELATED APPLICATION

This application is a U.S. National stage of International Application No. PCT/JP2017/001925 filed on Jan. 20, 2017. This application claims priority to Japanese Patent Application No. 2016-022979 filed with Japanese Patent Office on Feb. 9, 2016. The entire disclosure of Japanese Patent Application No. 2016-022979 is hereby incorporated herein by reference.

BACKGROUND

Field of the Invention

The present invention relates to a decorative sheet having a three-dimensional metallic design and a method for producing the decorative sheet.

Background Information

In the related art, there have been provided, for example, decorative panels representing a three-dimensional metallic design (see JP 4192842 B) and decorative sheets representing a three-dimensional metallic design (see JP 4690794 B), each by using a plurality of stacked metal layers. Such decorative panels and decorative sheets create three-dimensionality by inserting, between the plurality of metal layers, a transparent resin panel or resin film, for example. Such a resin panel and a resin film include a design formed thereon, such as a pattern, characters, and a figure. JP 5617258 B discloses a technology for representing a design. In the technology, the metal layers are partially removed in accordance with a desired design by using, for example, a laser or etching to achieve light transmission by the absence of metal layers.

SUMMARY

As described above, representing a design by metal layers by processing the metal layers requires removal by etching or a laser, for example. Either when a design is depicted by processing metal layers by a laser or when a design is depicted bye processing metal layers by etching, the processing requires a long lead time and is thus costly. In particular, when a design, such as a pattern, to be depicted by metal layers is a fine and complex one, the increase of the cost is significant. As a result, the decorative sheet having a three-dimensional metallic design is inevitably expensive. In a case where patterning by a printing technique is used for inexpensive production, reproduction characteristics for the pattern that forms the design are degraded as a result of bleeding.

An object of aspects of the present invention is to provide an inexpensive decorative sheet having a fine three-dimensional metallic design and, in order to provide such a decorative sheet, to provide a method for producing a decorative sheet that facilitates low-cost formation of a fine pattern.

Some aspects are described below as the means to solve the problems. Any of these aspects can be combined together as needed.

According to one aspect of the present invention, a method for producing a decorative sheet having a three-dimensional metallic design is provided. The method includes the steps of: (a) providing a transfer target sheet and a transfer sheet, (b) applying pressure, and (c) transferring. The transfer target sheet includes a transparent film base including primarily a thermoplastic resin and being light-transmissive and a first optical reflection layer formed adjacent to the transparent film base. The transfer sheet includes a transfer base film and a reflection pattern formation layer including a second optical reflection layer. The reflection pattern formation layer is formed adjacent to a first major surface of the transfer base film. The applying pressure includes placing the transfer sheet onto the transfer target sheet with the first major surface of the transfer base film facing toward the transfer target sheet and pressing a transfer tool against a second major surface of the transfer base film to embed a portion of the reflection pattern formation layer onto the transfer target sheet and bond the portion to the transfer target sheet. The transfer tool includes a transfer surface corresponding to a predetermined design. The transferring includes forming the predetermined design, in plan view, by peeling away the transfer sheet from the transfer target sheet to transfer a reflection pattern embedded on the transfer target sheet onto the transfer target sheet.

In the method for producing a decorative sheet, according to one aspect of the present invention, a transfer tool including a transfer surface corresponding to a predetermined design is pressed against a second major surface of the transfer base film to accomplish bonding, in step (b) and step (c). Thus reproduction characteristics for the transfer of the transfer pattern are improved, and the lead time is shortened so that the impact on the environment is reduced. As a result, an inexpensive decorative sheet having a three-dimensional metallic design is provided.

The above-described method for producing a decorative sheet having a three-dimensional metallic design may be configured as follows. The transfer tool may be a transfer roller, and an elastic roller may be disposed parallel to the transfer roller. The reflection pattern formation layer of the transfer sheet provided in step (a) may include an adhesive layer formed on a surface that is brought into contact with the transfer target sheet. In step (b), the reflection pattern may be embedded and bonded onto the transfer target sheet by applying heat to the transfer target sheet and the transfer sheet by the transfer roller and gripping and applying pressure to the transfer target sheet and the transfer sheet by the transfer roller and the elastic roller. This configuration makes it possible to continuously feed the transfer sheet and the transfer target sheet to the rotating transfer roller and elastic roller to accomplish pressure application and transfer continuously at high speed. As a result, the lead time is further shortened.

The above-described method for producing a decorative sheet having a three-dimensional metallic design may be configured as follows. In step (b), the reflection pattern may be embedded in an amount of greater than or equal to 0.5 μm toward the transparent film base. Since the reflection pattern is embedded in an amount of greater than or equal to 0.5 μm toward the transparent film base, reproduction characteristics are improved, and in addition, the metallic design of the formed decorative sheet provides increased three-dimensionality and thus provides an improved appearance.

According to another aspect of the present invention, a decorative sheet having a three-dimensional metallic design includes a transparent film base, a first optical reflection layer, and a reflection pattern. The transparent film base includes primarily a thermoplastic resin and is light-transmissive. The first optical reflection layer is formed adjacent to the transparent film base. The reflection pattern is formed over the transparent film base. The reflection pattern includes a second optical reflection layer configured to depict a predetermined design in plan view. The reflection pattern is embedded in an amount of greater than or equal to 0.5 µm toward the transparent film base.

In the decorative sheet according to another aspect of the present invention, the reflection pattern is embedded in an amount of greater than or equal to 0.5 µm toward the transparent film base. Thus, the decorative sheet has a fine three-dimensional metallic design and is inexpensive, and in addition, provides increased three-dimensionality and improved appearance, with the perimeter of the reflection pattern forming the design being conspicuous.

The above-described decorative sheet having a three-dimensional metallic design may be configured as follows. The first optical reflection layer may be formed adjacent to a first major surface of the transparent film base. The reflection pattern may be formed adjacent to a second major surface of the transparent film base, the second major surface being opposite to the first major surface. The first optical reflection layer and the second optical reflection layer may be spaced apart from each other by the transparent film base. Instead, the above-described decorative sheet having a three-dimensional metallic design may be configured as follows. The first optical reflection layer may be formed adjacent to a first major surface of the transparent film base. The reflection pattern may be formed adjacent to the first major surface of the transparent film base. The reflection pattern may further include a transparent pattern adhesive layer formed between the first optical reflection layer and the second optical reflection layer. The first optical reflection layer and the second optical reflection layer may be spaced apart from each other by the pattern adhesive layer.

According to another aspect of the present invention, the decorative sheet having a three-dimensional metallic design has a fine three-dimensional metallic design and is inexpensive. Furthermore, the method for producing a decorative sheet having a three-dimensional metallic design provides inexpensive decorative sheets having a fine three-dimensional metallic design.

DETAILED DESCRIPTION OF EMBODIMENTS

First Embodiment (1) Decorated Product

Figure 1A:
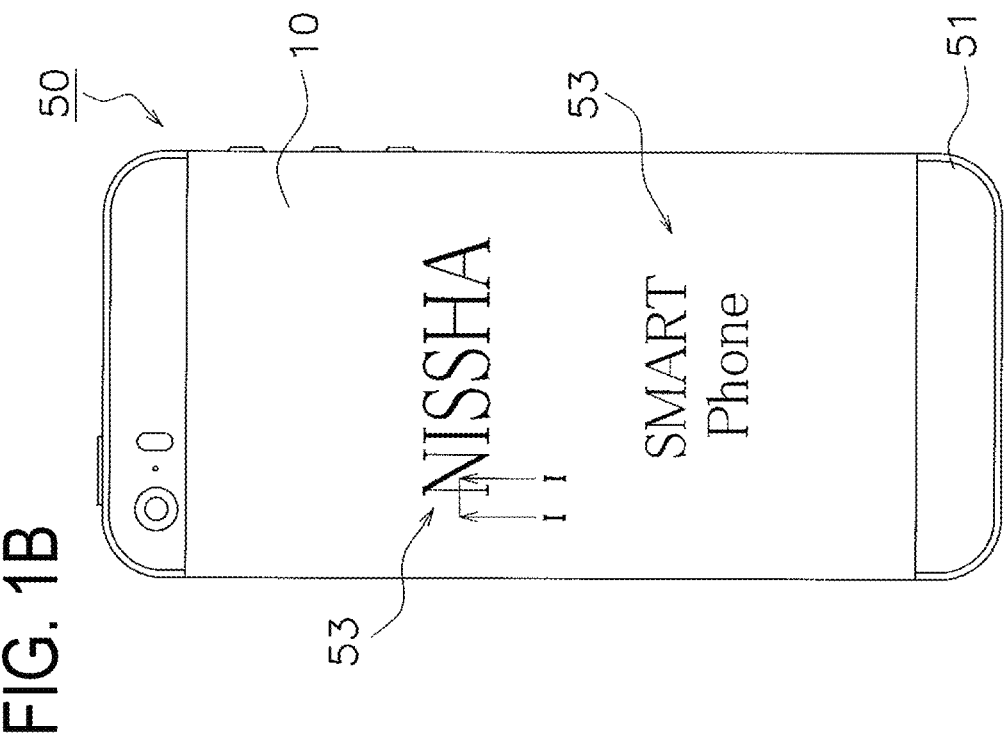
FIG. 1A is a plan view of a smartphone decorated with a decorative sheet according to a first embodiment.
Figure 1B:
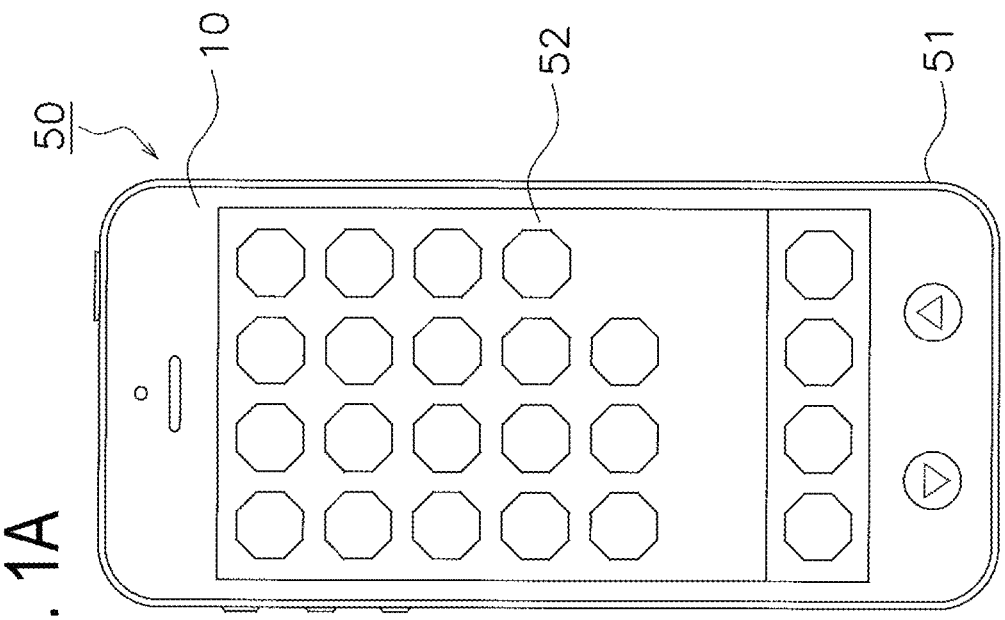
FIG. 1B is a bottom view of the smartphone illustrated in FIG. 1A.
Figure 2:
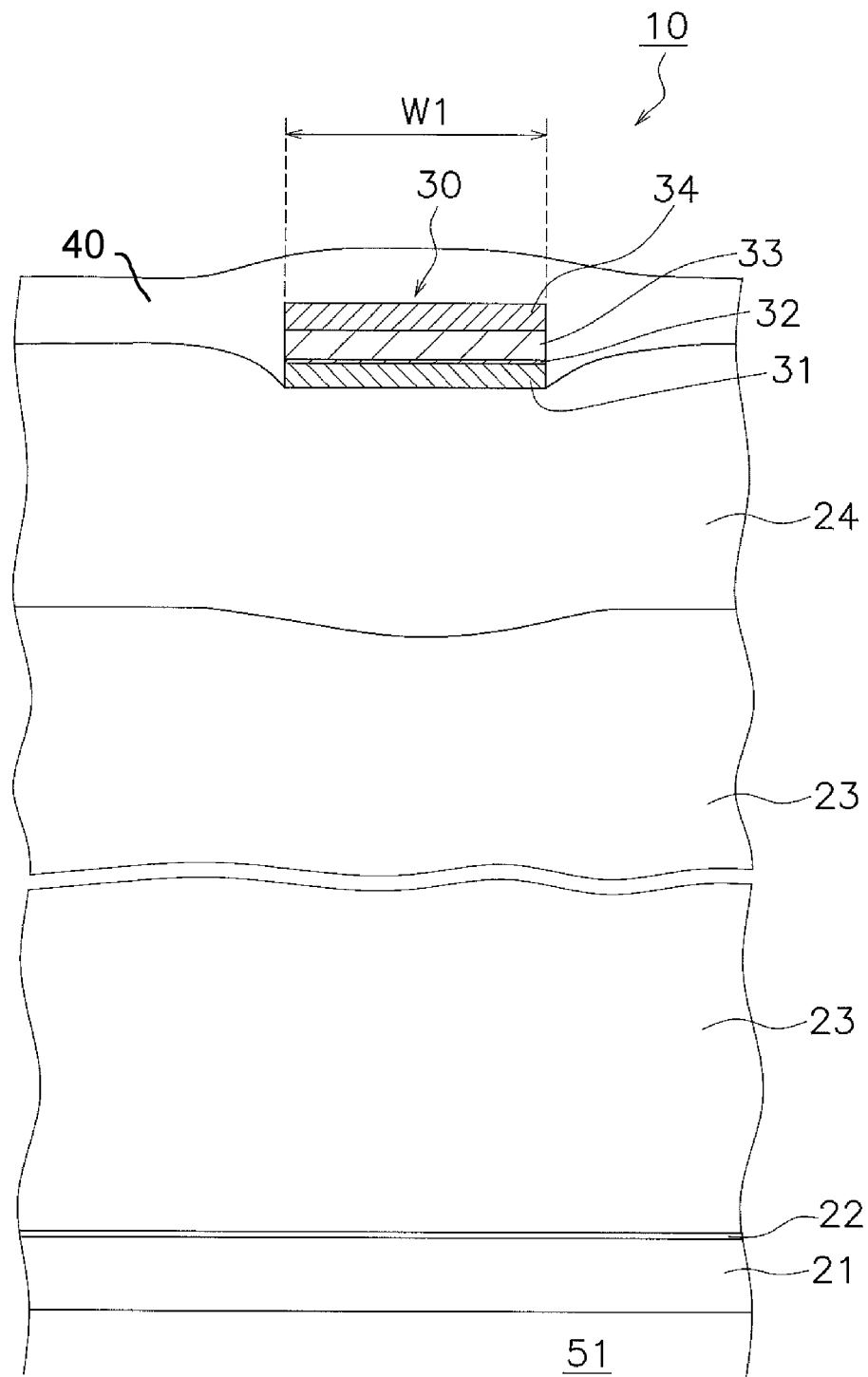
FIG. 2 is a cross-sectional view taken along line I-I of FIG. 1B.

A product decorated with a decorative sheet according to a first embodiment of the present invention will be described by citing a smartphone as an example. As illustrated in FIGS. 1A, 1B, and 2, a smartphone 50 is decorated with a decorative sheet 10 formed on the surface of a plastic case 51, which is formed by injection molding. The perimeter of a screen 52, which is on the front side of the plastic case 51 of the smartphone 50, illustrated in FIG. 1A, is metallically decorated, for example. Also, the back side of the smartphone 50, illustrated in FIG. 1B, is metallically decorated. In addition, a three-dimensional design 53, an example of which is a logo, is depicted on the back side of the plastic case 51 of the smartphone 50.

The decorative sheet 10 includes an underlying metal layer 22 (example, of a first optical reflection layer), which is formed over the entire area to serve as a base pattern that produces a metallic ornamental effect, and a pattern metal layer 32 (example of a second optical reflection layer), which is configured to depict a design, such as a pattern, characters, and a figure, as illustrated in FIG. 1B. The underlying metal layer 22 and the pattern metal layer 32 are spaced apart from each other by a transparent film base 23, which is disposed therebetween. By this configuration, a three-dimensional metallic design is represented.

For example, to enable the decorative sheet 10 to follow the surface of the three-dimensional shaped plastic case 51, the in-mold decoration insert system may be used, which is a technology for simultaneously performing decoration and molding by inserting a decorative sheet for molding within an injection molding mold. As a result, the smartphone 50, despite being formed of a plastic case 51, provides a high-quality metallic appearance with the three-dimensional design 53, which stands out three-dimensionally, depicted thereon.

In order to further accentuate such a three-dimensional metallic ornamental effect, it is desirable that the pattern be made finer. In the decorative sheet 10, a reflection pattern 30 has a pattern width W1 (see FIG. 2) of, for example, several hundred µm.

(2) Configuration of Decorative Sheet 10

FIG. 2 illustrates a cross section taken along line I-I of FIG. 1B. The decorative sheet 10 is attached on the plastic case 51. A sheet adhesive layer 21, the underlying metal layer 22, the transparent film base 23, an adhesion promoting layer 24, a pattern adhesive layer 31, the pattern metal layer 32, a vapor deposition anchor layer 33, a protective layer 34, and a transparent ink layer 40 are arranged over the plastic case 51 in the order stated. Adjacent ones of the layers, namely, the sheet adhesive layer 21, the underlying metal layer 22, the transparent film base 23, the adhesion promoting layer 24, the pattern adhesive layer 31, the pattern metal layer 32, the vapor deposition anchor layer 33, the protective layer 34, and the transparent ink layer 40, are layers in direct contact with each other. The transparent ink layer 40 is also in direct contact with the adhesion promoting layer 24.

Of these, the sheet adhesive layer 21, the underlying metal layer 22. the transparent film base 23, and the adhesion promoting layer 24 form a base vapor deposition film 20, and, the pattern adhesive layer 31 the pattern metal layer 32, the vapor deposition anchor layer 33, and the protective layer 34 form the reflection pattern 30.

(2-1) Reflection Pattern 30

Next, the pattern adhesive layer 31, the pattern metal layer 32, the vapor deposition anchor layer 33, and the protective layer 34, which form the reflection pattern 30, will be described in detail.

(2-1-1) Pattern Metal Layer 32

The pattern metal layer 32 is the second optical reflection layer including metal and having a metallic luster and is, for example, formed of a vapor-deposited metal layer. Examples of the vapor-deposited metal layer include vapor-deposited aluminum layers and vapor-deposited tin layers. The pattern metal layer 32, which is the second optical reflection layer, may be of an all reflection type, which reflects all light, or may be of a half mirror type, which transmits some light therethrough. The all reflection-type of pattern metal layer 32 has a thickness set within a range, for example, from 300 Å to 500 Å to reflect substantially all light. The half mirror-type of pattern metal layer 32 has a thickness set within a range, for example, from 150 Å to 200 Å to reflect some light while transmitting other light therethrough.

(2-1-2) Pattern Adhesive Layer 31

The pattern adhesive layer 31 is a layer for bonding the pattern metal layer 32 to the adhesion promoting layer 24. The pattern adhesive layer 31 has a thickness set within a range, for example, from 0.1 μm to 1 μm. For example, the thickness is 0.5 μm. The pattern adhesive layer 31 is formed by including therein primarily an acrylic-based resin, a urethane-based resin, a polyvinyl acetate-based resin, a vinyl chloride-based resin, or a vinyl chloride-vinyl acetate copolymer, for example. A supplementary material, such as, for example, a polymeric material for improving adhesion, may be included. Here, "including primarily" refers to cases in which the material constitutes, by weight, one half of the entire material. The pattern adhesive layer 31 is formed by, for example, application and drying of a resin dissolved in a solvent or application and solidification of a thermally melted resin. Examples of techniques for applying the resin include coating techniques and printing techniques. Examples of such coating techniques include comma coating techniques. Examples of such printing techniques include gravure printing and offset printing.

(2-1-3) Vapor Deposition Anchor Layer 33

The vapor deposition anchor layer 33 is a layer for increasing the adhesiveness of the pattern metal layer 32.

The vapor deposition anchor layer 33 serves to assist in retaining the shape of the pattern metal layer 32 during formation of the pattern metal layer 32, during the time before its transfer, and during its transfer. The vapor deposition anchor layer 33, before bonding to the pattern metal layer 32, is a layer containing a compound having functional groups that can bond to metal. For example, the vapor deposition anchor layer 33 includes a compound having isocyanate groups, which serve as functional groups that can bond to metal. The vapor deposition anchor layer 33, before bonding to the pattern metal layer 32, includes, for example, an acrylic-based resin and isocyanate. The isocyanate and metal are combined with each other to transform to a different substance before the vapor deposition anchor layer 33 is present in the decorative sheet 10.

(2-1-4) Protective Layer 34

The protective layer 34 is formed of a transparent resin having a relatively high hardness and being resistant to scratches. Examples of resins that may be used in the protective layer 34 include acrylic-based resins, cellulose-based resins, urea based resins, and melamine-based resins. The protective layer 34 has a thickness set within a range, for example, from 0.1 μm to 0.8 μm.

(2-2) Base Vapor Deposition Film 20

Next, the sheet adhesive layer 21, the underlying metal layer 22, the transparent film base 23, and the adhesion promoting layer 24, which form the base vapor deposition film 20, will be described in detail.

(2-2-1) Transparent Film Base 23

The transparent film base 23 is formed of a thermoplastic resin. Examples of thermoplastic resins that may be included in the transparent film base 23 include polyethylene terephthalate (PET) resins, acrylic-based resins, polyethylene resins, and polypropylene resins. The transparent film base 23 has a thickness set within a range, for example, from 10 μm to 100 μm. For example, the thickness is 20 μm.

(2-2-2) Adhesion Promoting Layer 24

The adhesion promoting layer 24 is a layer for facilitating bonding between the transparent film base 23 and the pattern adhesive layer 31 during transfer, Thus, the adhesion promoting layer 24 is formed of a material that can be easily bonded, compared with the transparence film base 23, to the pattern adhesive layer 31. The adhesion promoting layer 24 is formed of, for example, a thermoplastic resin or a UV (ultraviolet light) curable resin. Examples of thermoplastic resins that may be included in the adhesion promoting layer 24 include acrylic-based resins, polyester-based resins, urethane-based resins, and vinyl chloride-vinyl acetate copolymers. Examples of UV-curable resins that may be included in the adhesion promoting layer 24 include epoxy acrylate-based resins and urethane acrylate teased resins. The adhesion promoting layer 24 has a thickness set within a range, for example, from 0.1 μm to 10 μm. For example, the thickness is 5 μm.

(2-2-3) Underlying Metal Layer 22

The underlying metal layer 22 is the first optical reflection layer including metal and having a metallic luster and is, for example, formed of a vapor-deposited metal layer, as with the pattern metal layer 32. Examples of the vapor-deposited metal layer include vapor-deposited aluminum layers and vapor-deposited tin layers. The underlying metal layer 22, which is the first optical reflection layer, may be of an all reflection type. The underlying metal layer 22 may have a thickness set similarly to that of the all reflection-type of pattern metal layer 32. FIG. 2 illustrates a case in which the underlying metal layer 22 is formed directly on the transparent film base 23. Instead, a layer that, similarly to the aforementioned vapor deposition anchor layer 33, reinforces the adhesion of the underlying metal layer 22 may be provided between the transparent film base 23 and the underlying metal layer 22.

(2-2-4) Sheet Adhesive Layer 21

The sheet adhesive layer 21 is a layer for bonding the underlying metal layer 22 to the plastic case 51. The sheet adhesive layer 21 has a thickness set within a range, for example, from 0.1 µm to 5 µm. For example, the thickness is 1 µm. The sheet adhesive layer 21 is formed by including therein primarily an acrylic-based resin, a polyester-based resin, an epoxy resin, a vinyl chloride-vinyl acetate copolymer, or a urethane-based resin, for example. A supplementary material, such as, for example, a polymeric material for improving adhesion, may be included. The sheet adhesive layer 21 is formed by, for example, application and drying of a resin dissolved in a solvent or application and solidification of a thermally melted resin. Examples of techniques for applying the resin include coating techniques and printing techniques. Examples of such coating techniques include comma coating techniques. Examples of such printing techniques include gravure printing and offset printing, (2-3) Transparent Ink Layer 40

The transparent ink layer 40 is formed of a transparent resin. Examples of resins that may be used in the transparent ink layer 40 include UV curable resins and thermosetting resins. Examples of UV-curable resins that may be used in the transparent ink layer 40 include epoxy acrylate-based resins and urethane acrylate-based resins. Examples of thermosetting resins that may be used in the transparent ink layer 40 include urea-based resins and melamine-based resins. The transparent ink layer 40 may be colored. In the case that the transparent ink layer 40 is colored, a coloring ink, for example, may be used. Examples of coloring inks that may be used include inks containing a pigment or a dye that serves as a colorant.

(3) Method for Producing Decorative Sheet 10

Figure 3A:
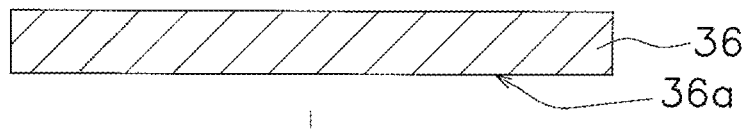
FIG. 3A is a cross-sectional view schematically illustrating a provided transfer base film.
Figure 3B:
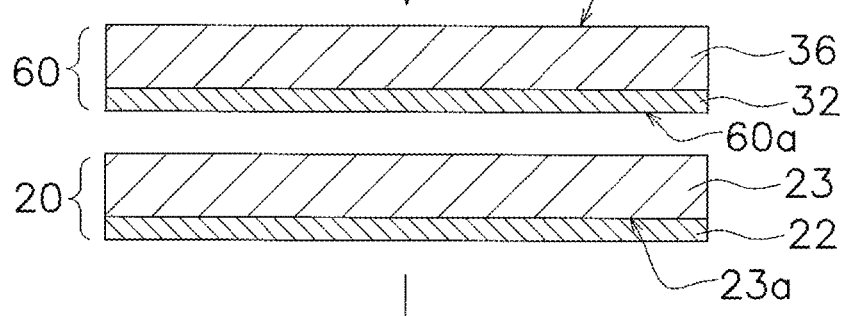
FIG. 3B is a cross-sectional view schematically illustrating a base vapor deposition film and a transfer sheet in a providing step.

FIGS. 3A to 3D schematically illustrate an overview of a decorative sheet 10 production flow. In FIGS. 3A to 3D, illustration of some of the layers is omitted in order to avoid reducing clearness. A transfer base film 36, illustrated in FIG. 3A, is provided. Although not illustrated in FIG. 3A, a reflection pattern formation layer 61 (see FIG. 4), which includes the pattern metal layer 32, is formed adjacent to a first major surface 36a of the transfer base film 36, and thus a release layer 35 (see FIG. 4), which includes wax, is formed on the first major surface 36a to facilitate transfer of the reflection pattern 30. Examples of waxes that may be used include polyethylene waxes and paraffin waxes. The release layer 35 may include a thermoplastic resin and a wax or may include a curable resin and a wax. The release layer 35 has a thickness of less than or equal to 0.1 µm, for example. Formation of the release layer 35 may be performed by using coating technique or a printing technique.

Figure 4:
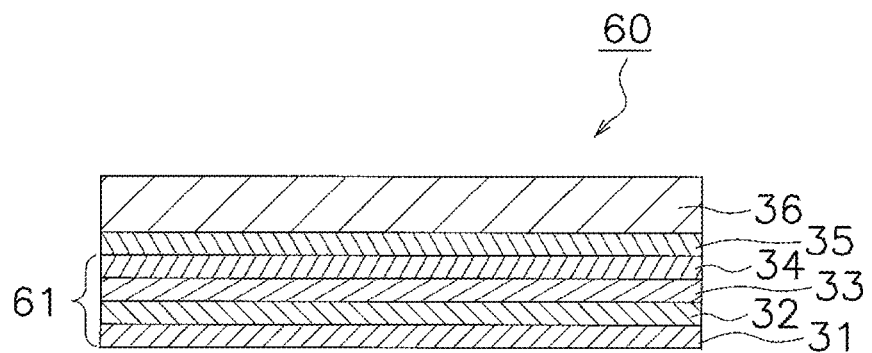
FIG. 4 is a schematic cross-sectional view illustrating an example of a configuration of the transfer sheet.
Figure 5:
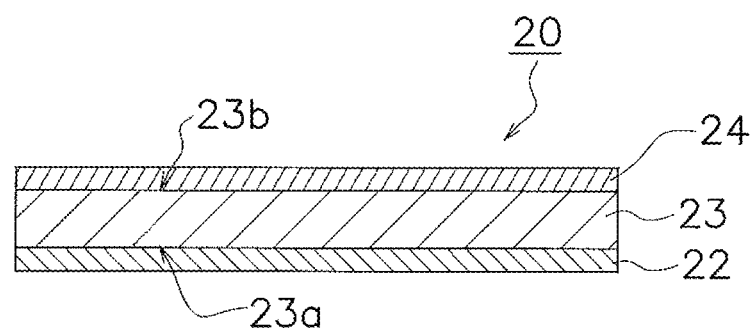
FIG. 5 is a schematic cross-sectional view illustrating an example of a configuration of the base vapor deposition film.

After formation of the release layer 35, the protective layer 34 and the vapor deposition anchor layer 33 (see FIG. 4) are formed sequentially although not illustrated in FIG. 3. Thereafter, furthermore, as illustrated in FIG. 3B, the pattern metal layer 32 (example of the second optical reflection layer) is formed adjacent to the first major surface 36a of the transfer base film 36 by vapor deposition of a metal film, Although not illustrated in FIG. 3B, the pattern adhesive layer 31 (see FIG. 4) is formed on the pattern metal layer 32. The transfer sheet 60, illustrated in FIG. 4, is formed via such steps. In a providing step, illustrated in FIG. 3B, the base vapor deposition film 20 (example of the transfer target sheet) is provided in addition to the transfer sheet 60. As illustrated in FIG. 5, in the base vapor deposition film 20, the underlying metal layer 22 (example of the first optical reflection layer) is formed adjacent to a first major surface 23a of the transparent film base 23.

Figure 3C:
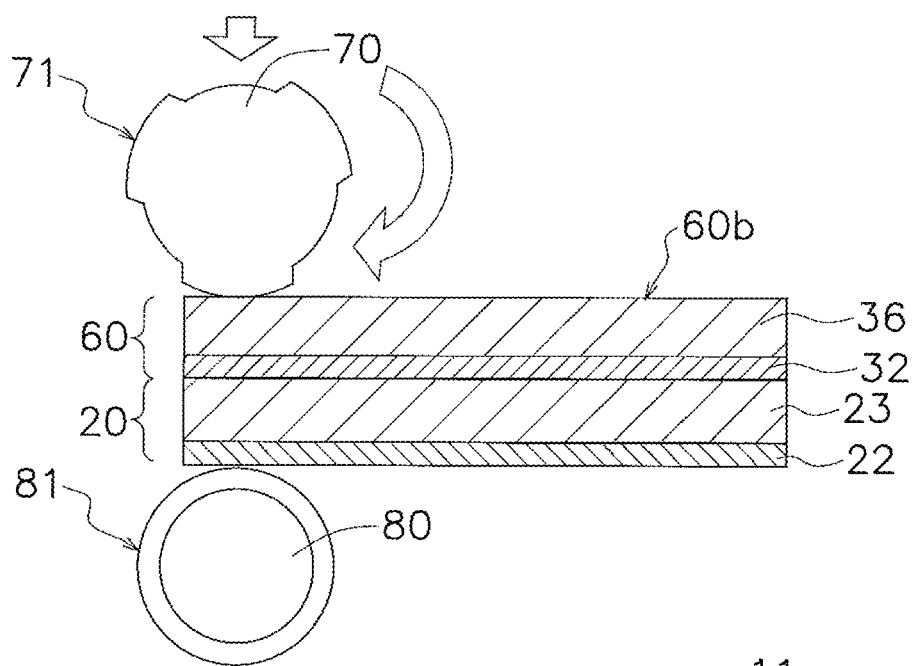
FIG. 3C is a schematic cross-sectional view illustrating a pressure application step.

FIG. 3C illustrates a pressure application step. In the pressure application step, the base vapor deposition film 20 is placed onto the transfer sheet 60 in such a manner that the first major surface 60a of the transfer sheet 60 faces toward the base vapor deposition film 20. The base vapor deposition film 20 and the transfer sheet 60, placed onto each other, are gripped between a transfer roller 70 (example of the transfer tool) and an elastic roller 80.

During this, the transfer roller 70 is pressed against a second major surface 60b of the transfer sheet 60, and pressure from the transfer roller 70 and the elastic roller 80 is applied to the base vapor deposition film 20 and the transfer sheet 60 while heat from the transfer roller 70 is applied thereto. The temperature of the transfer roller 70 is set within a range of, for example, from 160° C. to 200° C. The transfer roller 70 includes a transfer surface 71, which has a curved arc shape in cross section. The transfer surface 71 is a projection structure. A portion corresponding to the design 53 projects on the transfer surface 71. The elastic roller 80 is disposed parallel to the transfer roller 70. An elastic member 81 is attached on the outer periphery of the elastic roller 80. The elastic member 81 includes rubber, for example, and, in such a case, the elastic roller 80 is a rubber roller. High pressure is applied to the base vapor deposition film 20 and the transfer sheet 60 from the transfer roller 70 and the elastic roller 80. As a result, a portion of the reflection pattern formation layer 61, in other words, the reflection pattern 30, which is desired to be transferred, is caused to be embedded onto the base vapor deposition film 20.

Figure 3D:
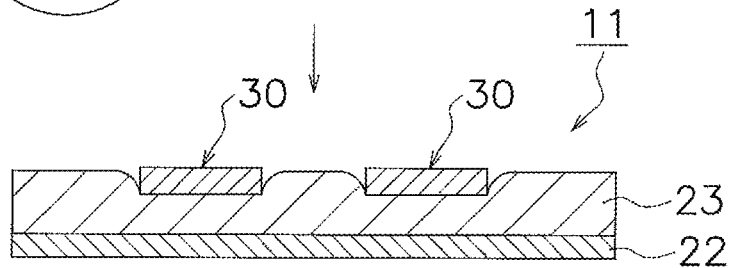
FIG. 3D is a schematic cross-sectional view illustrating a feature of the decorative sheet, which, after a transfer step, includes a reflection pattern formed thereon.

In a transfer step, the transfer sheet 60 is peeled away from the base vapor deposition film 20 to transfer the reflection pattern 30, which is embedded on the base vapor deposition film 20, to the base vapor deposition film 20 (see FIG. 3D). More specifically, the reflection pattern 30 can be regarded as being embedded on the adhesion promoting layer 24 and the transparent film base 23. Since the reflection pattern 30 is embedded on the transparent film base 23 of the base vapor deposition film 20, the reflection pattern 30 can be readily separated from the surrounding reflection pattern formation layer 61. Furthermore, in transferring, the release of the reflection pattern 30 from the transfer base film 36 is easy because of the function of the release layer 35. During this, since the transparent film base 23 is formed of a thermoplastic resin, the embedding of the reflection pattern 30 onto the transparent film base 23 is easy because of the heat applied from the transfer roller 70 to the transparent film base 23. More specifically, it can be thought that the embedding of the reflection pattern 30 onto the adhesion promoting layer 24 and the transparent film base 23 is easy. A decorative sheet 11, obtained by transferring, includes a predetermined design in plan view formed thereon, such as the three-dimensional design 53 illustrated in FIG. 1B.

The decorative sheet 11 includes no sheet adhesive layer 21 formed thereon. In addition, the decorative sheet 11 includes no transparent ink layer 40 formed thereon. The decorative sheet 11 may be commercialized as a finished product, or the decorative sheet 11 may be processed to produce the decorative sheet 10, which includes the sheet adhesive layer 21 and the transparent ink layer 40 formed thereon. Production of the decorative sheet 10 from the decorative sheet 11 can be accomplished by forming the sheet adhesive layer 21 and the transparent ink layer 40 on the decorative sheet 11 by using a printing technique or a coating technique.

(4) Features

As described above, the base vapor deposition film 20 (example of the transfer target sheet) and the transfer sheet 60 may be produced in advance and stocked. Thus, the principal part of the time necessary for production of the decorative sheet 10 or 11 after a design for the decorative sheet 10 or 11 is determined and preparation of the transfer roller 70 (transfer tool) and others is completed, that is, the lead time, is the time necessary for the steps, from the providing step through the transfer step. The pressure application step and the transfer step are performed simply by rotating the transfer roller 70 and the elastic roller 80 to move the base vapor deposition film 20 and the transfer sheet 60 in accordance with the rotation speed and thus can be completed in a short time compared with etching or laser processing. The production line may be formed such that the sheet adhesive layer 21 and the transparent ink layer 40 can be formed in the same line. This makes it possible to provide a formation step for the sheet adhesive layer 21 and the transparent ink layer 40 without significantly changing the lead time, with the time from the unwinding of the base vapor deposition film 20 roll and the transfer sheet 60 roll to the coiling of the decorative sheet 10 taken into account. In addition, in comparison with etching, water use for cleaning and waste liquid treatment can be omitted, and thus the impact on the environment is reduced. Thus, the shortened lead time for production and reduced impact on the environment contribute to reduced costs of producing the decorative sheets 10 and 11.

Furthermore, in the pressure application step, the transfer surface 71, which has a curved arc shape in cross section, is pressed against the base vapor deposition film 20 and the transfer sheet 60, placed onto each other, and thus a large force is applied to a very small area thereof. Further, the reflection pattern 30 is embedded onto the base vapor deposition film 20 by being pressed by the transfer surface 71. Thus, for the portion that is to remain in the transfer sheet 60 and the portion that is to be transferred as the reflection pattern 30 from the transfer sheet 60, in the reflection pattern formation layer 61 of the transfer sheet 60, reliability for separation and bonding is improved. As a result, reproduction characteristics for the transfer of the reflection pattern 30 are improved. Thus, even in a case where the pattern width W1 of the reflection pattern 30 is made narrow to form a design such as a fine pattern, the decorative sheets 10 and 11 having a three-dimensional metallic design, which are inexpensive, can be provided. It is preferable that, during this, the transfer roller 70 have a temperature set at around the softening point of the transparent film base 23, which is, for example, within a range of the softening point ±20°C., to achieve appropriate embedding.

Figure 6:
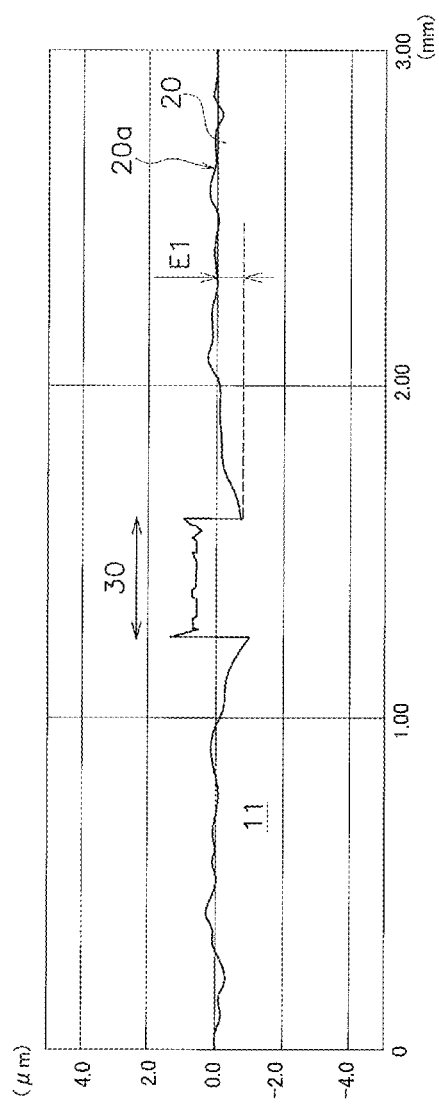
FIG. 6 is a graph illustrating the result of a roughness tester measurement of regions around a reflection pattern of the first embodiment.
Figure 7:
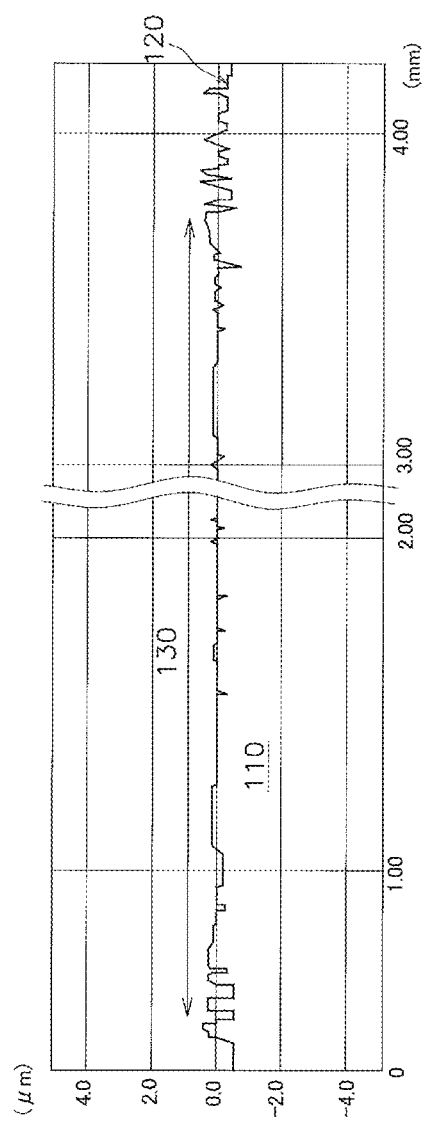
FIG. 7 is a graph illustrating the result of a roughness tester measurement of regions around metal layers of a known decorative sheet having a three-dimensional metallic design.

FIGS. 6 and 7 illustrate the results of measurements made by using a roughness tester. The measurements were performed on an example of the decorative sheet 11 having a three-dimensional metallic design, produced by using the production method according to the first embodiment, and on an example of a decorative sheet having a three-dimensional metallic design, produced by a known production method. It can be seen that, in the decorative sheet 11, as illustrated in FIG. 6, the reflection pattern 30 is embedded on the base vapor deposition film 20. An embedding amount E1, which is an amount of embedding of the reflection pattern 30 onto the base vapor deposition film 20, is approximately from 1.0 μm to 0.8 μm. In contrast, no such embedding is observed in a decorative sheet 110, illustrated in FIG. 7, which was produced by a known production method. The embedding amount E1 is a height from a surface 20a of the base vapor deposition film 20 to the surface of the pattern adhesive layer 31 of the reflection pattern 30. In the embodiment described above, the embedding amount E1 is a height from the surface of the adhesion promoting layer 24 to the surface of the pattern adhesive layer 31 of the reflection pattern 30. Because of such embedding of the reflection pattern 30 on the base vapor deposition film 20, the surface 20a of the base vapor deposition film 20 is depressed. In cross-sectional view, the surface 20a of the base vapor deposition film 20 is inclined such that the surface 20a faces toward the reflection pattern 30. The way that the reflection pattern 30 appears changes depending on the deformation of the surface 20a of the base vapor deposition film 20.

Figure 8:
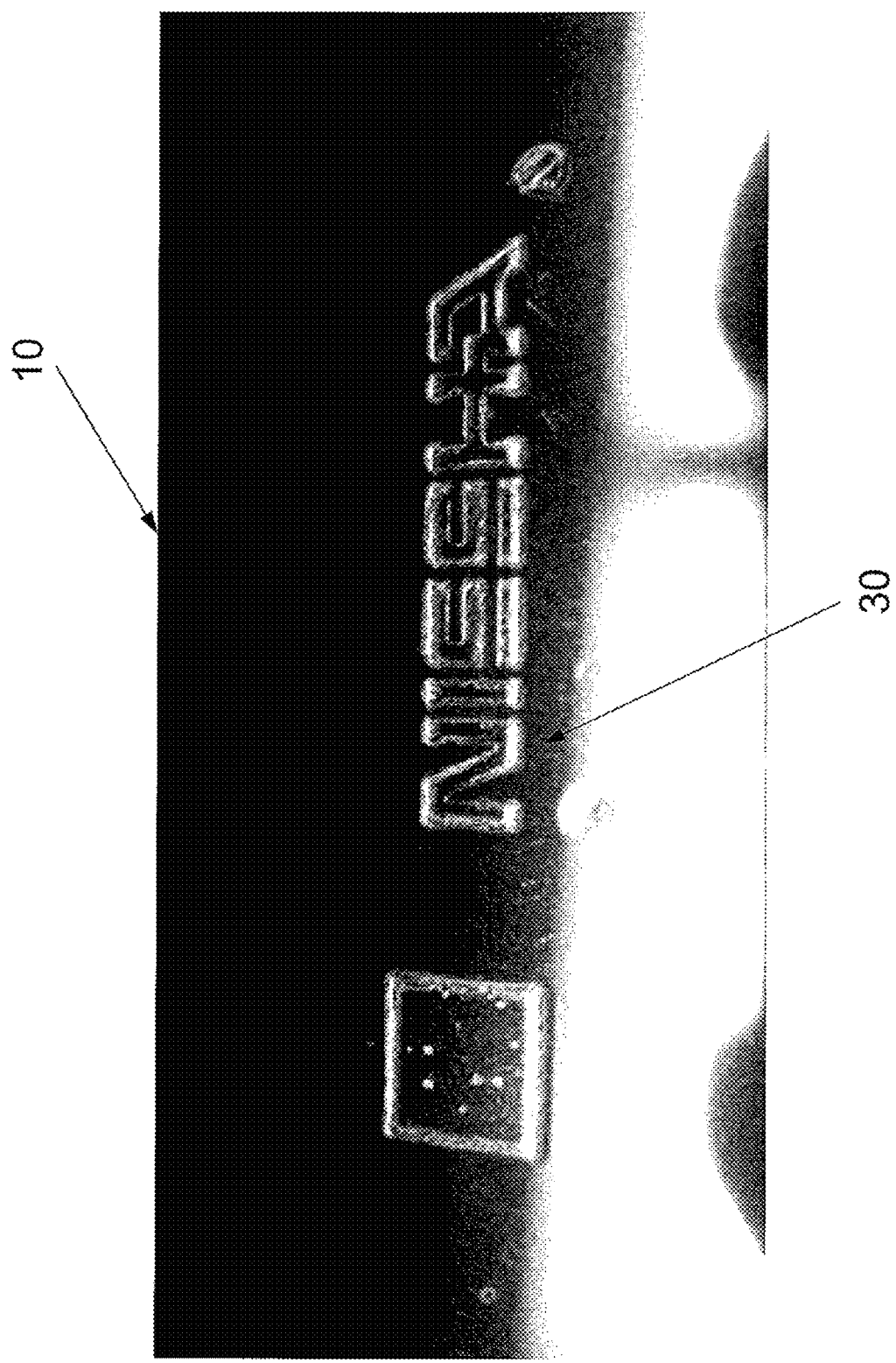
FIG. 8 is a captured image of an example of the decorative sheet according to the first embodiment.
Figure 9:
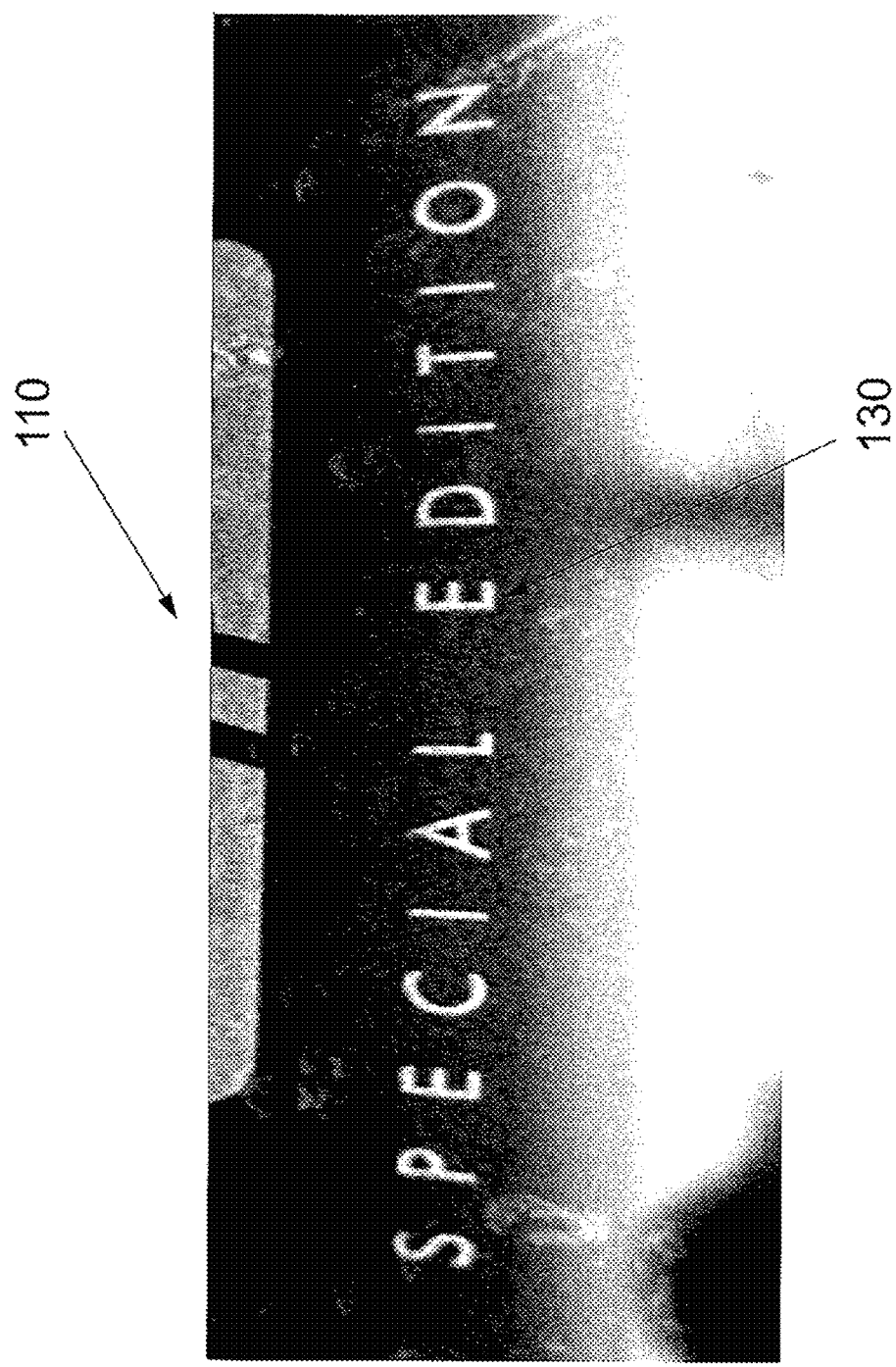
FIG. 9 is a captured image of an example of a decorative sheet produced by a known method.

Next, a difference in appearance between the decorative sheet having a three-dimensional metallic design, produced by using the production method according to the first embodiment, and a decorative sheet having a three-dimensional metallic design, produced by a known production method, will be described with reference to FIGS. 8 and 9. From the photograph of the reflection pattern 30 according to the first embodiment, shown in FIG. 8, it is seen that the perimeter of the reflection pattern 30, which forms a design, is conspicuous, which increases three-dimensionality. In contrast, from the photograph of a known reflection pattern 130, shown in FIG. 9, it is found that the reflection pattern 130, although generally appearing to stand out, has low three-dimensionality compared with the reflection pattern 30 according to the first embodiment shown in FIG. 8. To achieve the appearance shown in FIG. 8, it is preferable that the embedding of the reflection pattern 30 be in an amount of greater than or equal to 0.5 μm.

Second Embodiment (5) Configuration of Decorative Sheet 12

Figure 10:
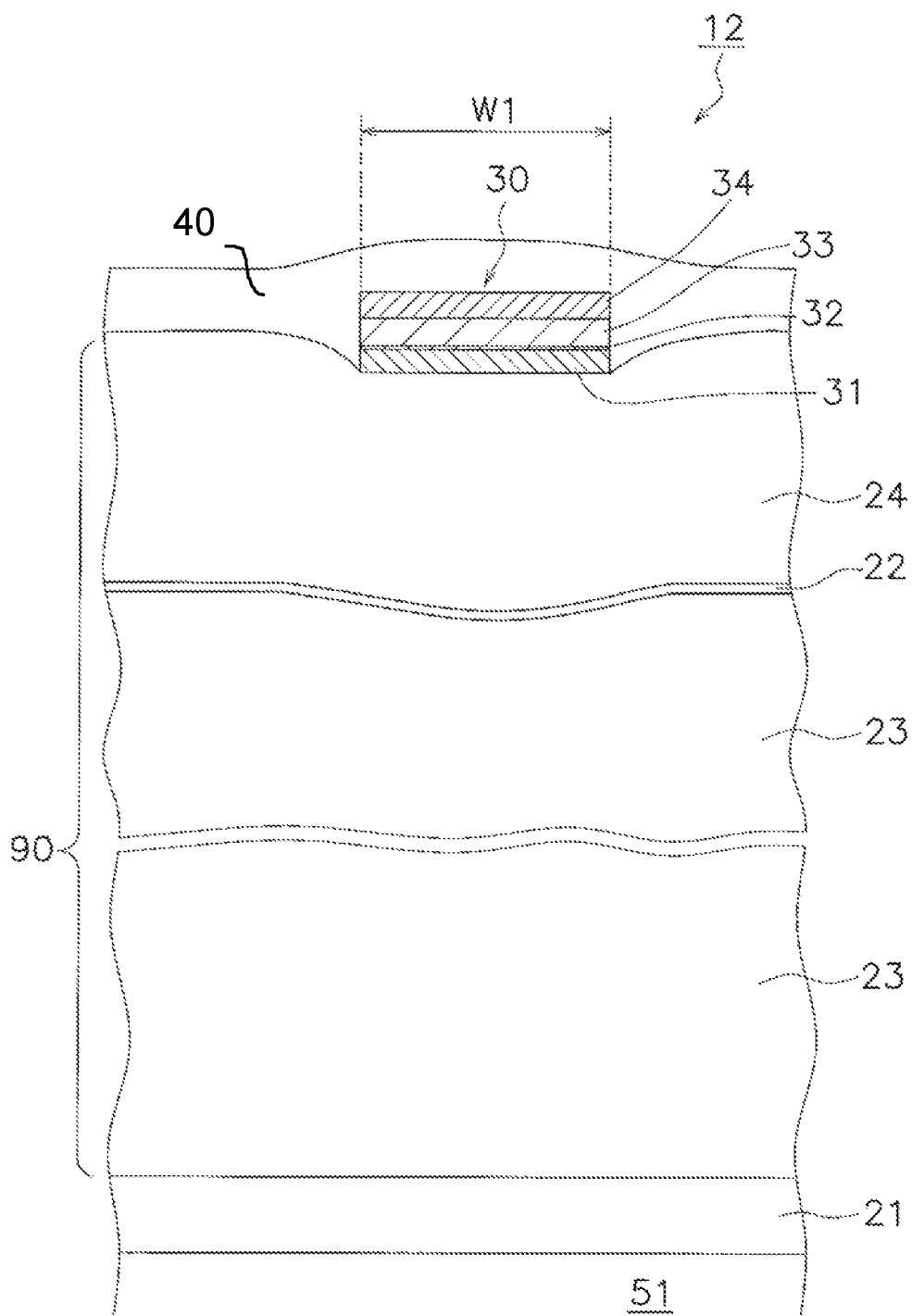
FIG. 10 is a cross-sectional view of a smartphone including a decorative sheet according to a second embodiment formed thereon.

FIG. 10 illustrates an example of the structure of a decorative sheet 12, according to a second embodiment, in cross section. The configuration of the decorative sheet 12 according to the second embodiment is different from the configuration of the decorative sheet 10 of the first embodiment in the position of the location of the underlying metal layer 22. To describe the position of location of the underling metal layer 22, the surface adjacent to which the reflection pattern 30 is formed in the first embodiment is referred to as a second major surface 23b of the transparent film base 23 and the surface opposite to the second major surface 23b is referred to as a first major surface 23a. In the first embodiment, the underlying metal layer 22 is formed adjacent to the first major surface 23a of the transparent film base 23, whereas, in the decorative sheet 12 of the second embodiment, the underlying meta layer 22 is formed adjacent to the second major surface 23b of the transparent film base 23. The underlying metal layer 22 of the decorative sheet 12 is formed between the transparent film base 23 and the adhesion promoting layer 24. Since the design depicted by the pattern metal layer 32 appears three-dimensional because the underlying metal layer 22 and the pattern metal layer 32 are spaced apart from each other by the thickness of the transparent film base 23 and the adhesion promoting layer 24, it is preferable that the transparent film base 23 and the adhesion promoting layer 24 in the second embodiment be formed to have a greater thickness than in the first embodiment.

The layers that form the decorative sheet 12 of the second embodiment are similar to the layers that form the decorative sheet 10 of the first embodiment. Thus, a detailed description of the layers that form the decorative sheet 12 of the second embodiment will be omitted.

(6) Method for Producing Decorative Sheet 12

A method for producing the decorative sheet 12 of the second embodiment includes a providing step, a pressure application step, and a transfer step similarly to the method for producing the decorative sheet 10 of the first embodiment. In addition, the method is similar to the method for producing the decorative sheet 10 of the first embodiment in that the sheet adhesive layer 21 and the transparent ink layer 40 are formed by using a printing technique or a coating technique after the transfer step.

As illustrated in FIG. 10, a base vapor deposition film 90, which is used in the method for producing the decorative sheet 12 of the second embodiment, includes the transparent film base 23, the underlying metal layer 22 and the adhesion promoting layer 24, which are stacked in the order stated. The decorative sheet 12 can be produced by using the base vapor deposition film 90 instead of the base vapor deposition film 20 and by performing the same steps as in the above-described method for producing the decorative sheet 10.

(7) Features

Figure 11:
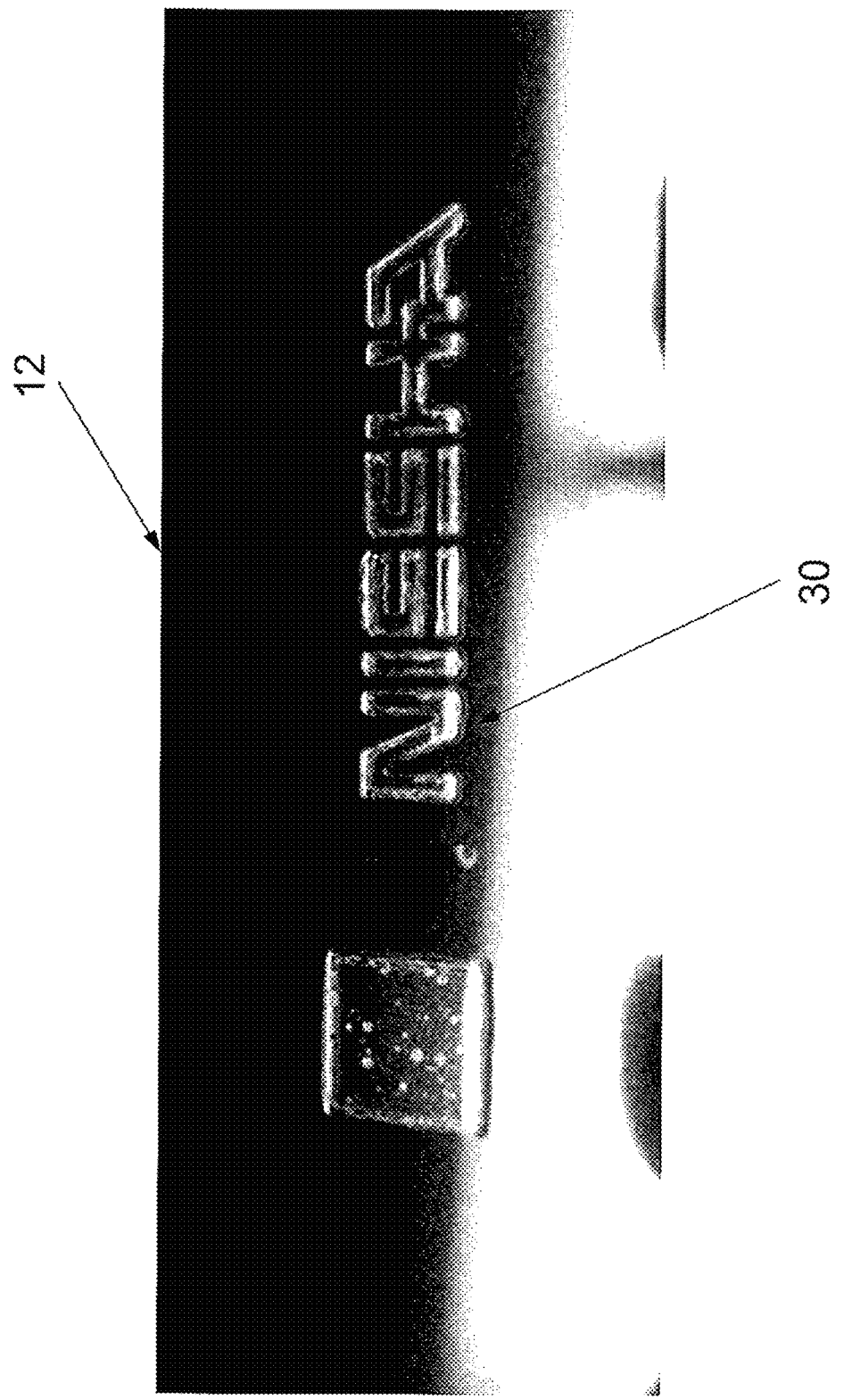
FIG. 11 is a captured image of an example of the decorative sheet according to the second embodiment.

In the decorative sheet 12 having a three-dimensional metallic design according to the second embodiment, too, the reflection pattern 30 according to the second embodiment shown in FIG. 11 has increased three-dimensionality, with the perimeter of the reflection pattern 30, which forms the pattern, being conspicuous. To achieve the appearance shown in FIG. 11, it is preferable that the embedding of the reflection pattern 30 be in an amount of greater than or equal to 0.5 µm.

(8) Modified Example

While the first embodiment and the second embodiment of the present invention have been described in the foregoing, aspects of the present invention are not limited to the embodiments described above, and various changes may be made thereto without departing from the scope of the invention. In particular, any of the embodiments and modified examples set forth in this specification may be combined together as needed.

(8-1)

Figure 12A:
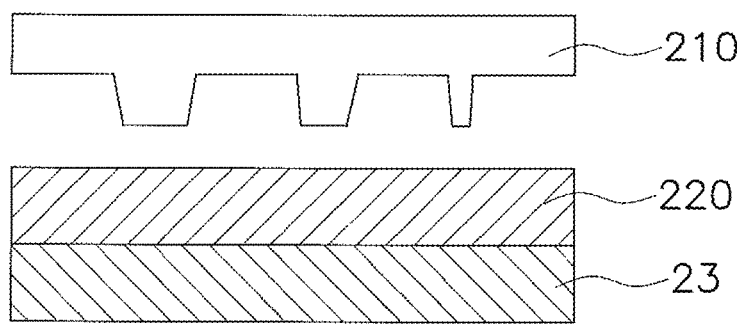
FIG. 12A is a schematic cross-sectional view illustrating a step in which a hologram stamper and a base vapor deposition film are provided.

In the first embodiment and the second embodiment described above, the underlying metal layer 22 and/or the pattern metal layer 32 may be a hologram. FIGS. 12A to 12D illustrate an overview of a forming method in the case that the underlying metal layer 22 is a hologram. Mass production of the hologram can be accomplished by using a stamper 210, which is illustrated in FIG. 12A. The stamper 210 is formed by, for example, recording interference fringes onto a photocurable resin applied on a metal sheet and forming a silver plating for release by reduction reaction of silver nitrate. In addition, for example, an electroless nickel plating may be applied to the front side of the stamper 210 to impart durability thereto. The back side may be coated by electroformed copper. A UV-curable resin 220 is applied to the transparent film base 23, on which a hologram is to be formed.

Figure 12B:
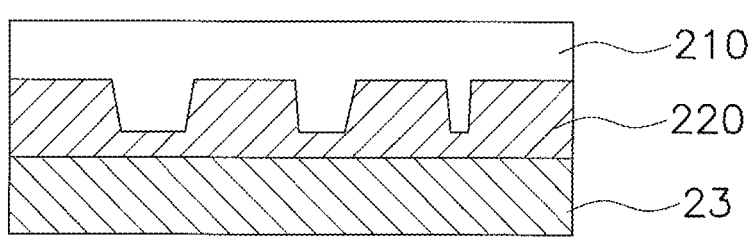
FIG. 12B is a schematic cross-sectional view illustrating a step in which pressing by the stamper is performed.
Figure 12C:
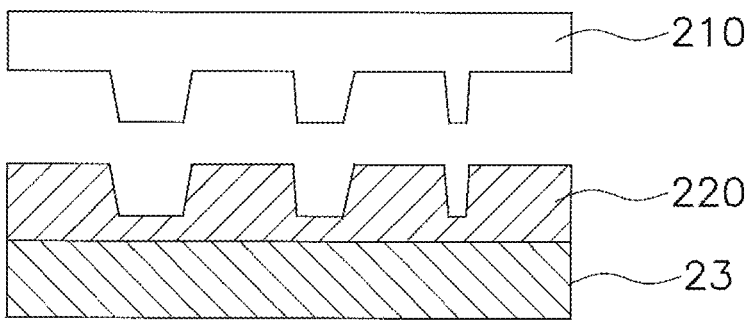
FIG. 12C is a schematic cross-sectional view illustrating a release step.
Figure 12D:
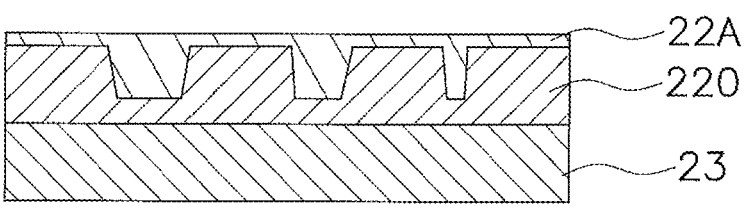
FIG. 12D is a schematic cross-sectional view illustrating a vapor-deposited metal layer formation step.

As illustrated in FIG. 12B, ultraviolet light is directed from the transparent film base 23 side in a state in which the stamper 210 is pressed against the UV-curable resin 220 on the transparent film base 23. After the UV-curable resin 220 is cured by ultraviolet light, the stamper 210 is removed as illustrated in FIG. 12C. Next, metal is vapor-deposited onto the UV-curable resin 220, which includes a recess and projection formed thereon by the stamper 210 (see FIG. 12D). Thus, an underlying metal layer 22A, which is a hologram, is formed.

Similarly, the pattern metal layer 32 may be a hologram. It is also possible that both the pattern metal layer 32 and the underlying metal layer 22 may be a hologram.

(8-2)

FIG. 2 illustrates a case in which no additional layer is provided between the adhesion promoting layer 24 and the transparent film base 23, but an additional layer may be provided. An example of such an additional layer is a design layer including a design drawn with ink.

(8-3)

In the first embodiment and the second embodiment described above, cases in which the adhesion promoting layer 24 is used are described. Instead, the adhesion promoting layer 24 may be omitted.

(8-4)

In the first embodiment and the second embodiment described above, cases in which the first optical reflection layer and the second optical reflection layer are each formed of a metal layer are described. Instead, the first optical reflection layer and the second optical reflection layer may each be formed of a layer other than a metal layer provided that the layer can reflect light and exhibit metallic luster. For example, the first optical reflection layer and the second optical reflection layer may each be formed of organic metal that exhibits metallic luster.

(8-5)

In the first embodiment and the second embodiment described above, cases in which the transfer roller 70 including the transfer surface 71, which has a curved arc shape in cross section, is used as a transfer tool are described, but the transfer surface may not necessarily be of an arc shape in cross section. It is preferable that the transfer surface be convexly curved such that, during transferring, high pressure can be consistently applied from the transfer tool to the transfer base film. Thus, when it is possible to apply high pressure consistently, good uniform three-dimensionality can be imparted to the entire fine design. The rotational movement of the transfer tool may not necessarily be a continuous rotation in the same direction such as that of the transfer roller 70. The rotational movement includes, for example, reciprocating movement such as that of a pendulum, for example.

(8-6)

In the modified example set forth above, a transfer tool having a convexly curved transfer surface is used. Instead a transfer tool of a projection structure having a flat transfer surface may be used, and the transfer sheet and the transfer target sheet may be placed between a flat rubber plate and the transfer tool and subjected to pressing.

The invention claimed is:

1. A method for producing a decorative sheet having a three-dimensional metallic design, the method comprising:
providing a transfer target sheet and a transfer sheet, the transfer target sheet including a transparent film base including a thermoplastic resin and being light-transmissive and a first optical reflection layer that is formed adjacent to the transparent film base and has metal, the transfer sheet including a transfer base film and a reflection pattern formation layer including a second optical reflection layer that has metal, the reflection pattern formation layer being formed adjacent to a first major surface of the transfer base film;
applying pressure, the applying of pressure including placing the transfer sheet onto the transfer target sheet with the first major surface of the transfer base film facing toward the transfer target sheet, and pressing a transfer tool, which includes a surface with a projection that has a shape of a predetermined design, against a second major surface of the transfer base film to embed a portion of the reflection pattern formation layer, which has the shape of the predetermined design, onto the transfer target sheet and bond the portion of the reflection pattern formation layer to the transfer target sheet; and transferring, the transferring including forming the predetermined design, in plan view, by peeling away the transfer sheet from the transfer target sheet to transfer, onto the transfer target sheet, a reflection pattern that is formed by the portion of the reflection pattern formation layer.

2. The method for producing a decorative sheet having a three-dimensional metallic design, according to claim 1,
wherein the transfer tool is a transfer roller, and an elastic roller is disposed parallel to the transfer roller,
the providing of the transfer target sheet and the transfer sheet includes forming an adhesive layer on a surface of the reflection pattern formation layer such that the transfer sheet contacts with the transfer target sheet, and
in the applying of pressure, the reflection pattern is embedded and bonded onto the transfer target sheet by applying heat to the transfer target sheet and the transfer sheet by the transfer roller and gripping and applying pressure to the transfer target sheet and the transfer sheet by the transfer roller and the elastic roller.

3. The method for producing a decorative sheet having a three-dimensional metallic design, according to claim 1, wherein, in the applying of pressure, the reflection pattern is embedded in an amount from 0.8 µm to 1.0 µm toward the transparent film base.

4. The method for producing a decorative sheet having a three-dimensional metallic design, according to claim 2, wherein, in the applying of pressure, the reflection pattern is embedded in an amount from 0.8 µm to 1.0 µm toward the transparent film base.

5. The method for producing a decorative sheet having a three-dimensional metallic design, according to claim 1, wherein,
in the applying of pressure, the reflection pattern is embedded onto the transparent film base such that a surface of the transparent film base around the reflection pattern is inclined downward as approaching the reflection pattern.

6. The method for producing a decorative sheet having a three-dimensional metallic design, according to claim 1, wherein
the applying of pressure further includes placing the transfer sheet onto the transfer target sheet with the second optical reflection layer and the transparent film base facing toward each other and pressing the transfer tool against the second major surface of the transfer base film to embed the portion of the reflection pattern formation layer onto the transparent film base of the transfer target sheet and bond the portion to the transparent film base of the transfer target sheet, and
the transferring further includes forming the predetermined design, in the plan view, by peeling away the transfer sheet from the transfer target sheet to transfer the reflection pattern embedded on the transparent film base of the transfer target sheet onto the transfer target sheet.

7. The method for producing a decorative sheet having a three-dimensional metallic design, according to claim 6,
wherein the transfer tool is a transfer roller, and an elastic roller is disposed parallel to the transfer roller,
the providing of the transfer target sheet and the transfer sheet includes forming an adhesive layer on a surface of the reflection pattern formation layer such that the transfer sheet contacts with the transfer target sheet, and
in the applying of pressure, the reflection pattern is embedded and bonded onto the transfer target sheet by applying heat to the transfer target sheet and the transfer sheet by the transfer roller and gripping and applying pressure to the transfer target sheet and the transfer sheet by the transfer roller and the elastic roller.

8. The method for producing a decorative sheet having a three-dimensional metallic design, according to claim 6, wherein, in the applying of pressure, the reflection pattern is embedded in an amount from 0.8 µm to 1.0 µm toward the transparent film base.

9. The method for producing a decorative sheet having a three-dimensional metallic design, according to claim 7, wherein, in the applying of pressure, the reflection pattern is embedded in an amount from 0.8 µm to 1.0 µm toward the transparent film base.

10. The method for producing a decorative sheet having a three-dimensional metallic design, according to claim 6, wherein, in the applying of pressure, the reflection pattern is embedded onto the transparent film base such that a surface of the transparent film base around the reflection pattern is inclined downward as approaching the reflection pattern.

11. The method for producing a decorative sheet having a three-dimensional metallic design, according to claim 1, wherein
the providing of the transfer target sheet and the transfer sheet further includes providing the transfer target sheet that further includes an adhesion promoting layer formed on the transparent film base or the first optical reflection layer,
the applying of pressure further includes placing the transfer sheet onto the transfer target sheet with the second optical reflection layer and the adhesion promoting layer facing toward each other and pressing the transfer tool against the second major surface of the transfer base film to embed the portion of the reflection pattern formation layer onto the adhesion promoting layer of the transfer target sheet and bond the portion to the adhesion promoting layer of the transfer target sheet, and
the transferring further includes forming the predetermined design, in the plan view, by peeling away the transfer sheet from the transfer target sheet to transfer the reflection pattern embedded on the adhesion promoting layer of the transfer target sheet onto the transfer target sheet.

12. The method for producing a decorative sheet having a three-dimensional metallic design, according to claim 11,
wherein the transfer tool is a transfer roller, and an elastic roller is disposed parallel to the transfer roller,
the providing of the transfer target sheet and the transfer sheet includes forming an adhesive layer on a surface of the reflection pattern formation layer such that the transfer sheet contacts with the transfer target sheet, and
in the applying of pressure, the reflection pattern is embedded and bonded onto the transfer target sheet by applying heat to the transfer target sheet and the transfer sheet by the transfer roller and gripping and applying pressure to the transfer target sheet and the transfer sheet by the transfer roller and the elastic roller.

13. The method for producing a decorative sheet having a three-dimensional metallic design, according to claim 11, wherein, in the applying of pressure, the reflection pattern is embedded in an amount from 0.8 μm to 1.0 μm toward the transparent film base.

14. The method for producing a decorative sheet having a three-dimensional metallic design, according to claim 12, wherein, in the applying of pressure, the reflection pattern is embedded in an amount from 0.8 μm to 1.0 μm toward the transparent film base.

15. The method for producing a decorative sheet having a three-dimensional metallic design, according to claim 11, wherein, in the applying of pressure, the reflection pattern is embedded onto the adhesion promoting layer such that a surface of the adhesion promoting layer around the reflection pattern is inclined downward as approaching the reflection pattern.

* * * * *